(12) United States Patent
Zelezniak et al.

(10) Patent No.: US 11,122,131 B1
(45) Date of Patent: Sep. 14, 2021

(54) EDGE CLOUD RESOURCE LOCATION USING ENHANCED DNS SERVICE

(71) Applicant: AT&T Intellectual Property I, L.P., Atlanta, GA (US)

(72) Inventors: Aleksandr Zelezniak, Morganville, NJ (US); Abhigyan, Basking Ridge, NJ (US); Kaustubh Joshi, Short Hills, NJ (US); Oliver Spatscheck, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/951,313

(22) Filed: Nov. 18, 2020

(51) Int. Cl.
*H04L 29/08* (2006.01)
*H04W 4/08* (2009.01)
*H04L 12/741* (2013.01)
*H04L 29/12* (2006.01)

(52) U.S. Cl.
CPC ............ *H04L 67/16* (2013.01); *H04L 45/745* (2013.01); *H04L 61/1511* (2013.01); *H04L 67/101* (2013.01); *H04L 67/1014* (2013.01); *H04L 67/322* (2013.01); *H04W 4/08* (2013.01); *H04L 61/1541* (2013.01)

(58) Field of Classification Search
CPC ..... H04L 67/16; H04L 67/322; H04L 67/327; H04L 61/1511; H04L 41/0893; H04L 41/0896; H04L 43/0876; H04L 45/04; H04L 67/10; H04L 67/1004; H04L 67/101; H04L 67/1017; H04L 67/1019; H04L 67/1021

See application file for complete search history.

(56) References Cited

U.S. PATENT DOCUMENTS

| | | | | |
|---|---|---|---|---|
| 10,567,288 | B1 * | 2/2020 | Mutnuru | ............. H04L 67/1021 |
| 10,715,482 | B2 * | 7/2020 | Rahman | ............. H04L 61/1511 |
| 2016/0301762 | A1 * | 10/2016 | Strijkers | ............... H04L 67/322 |

OTHER PUBLICATIONS

Chen et al.; "End-User Mapping: Next Generation Request Routing for Content Delivery"; ACM SIGCOMM Computer Communication Review; vol. 45; Aug. 2015; 15 pages.

* cited by examiner

*Primary Examiner* — Kyung H Shin
(74) *Attorney, Agent, or Firm* — BakerHostetler

(57) ABSTRACT

Methods, systems, and apparatuses, among other things, may direct client requests to an Edge Cloud location satisfying application requirements associated with the request. Moreover, a domain name service (DNS) query may be received, one or more requests associated with DNS query may be determined, a server may be identified based on the one or more requests, and the DNS query may be redirected to the identified server.

19 Claims, 8 Drawing Sheets

500

510 — Receive a domain name service (DNS) query

520 — Determine one or more requests associated with the DNS query

530 — Identifying a server based on the one or more requests

540 — Redirect the DNS query to the identified server

FIG. 5

EDGE CLOUD RESOURCE LOCATION USING ENHANCED DNS SERVICE

TECHNICAL FIELD

This disclosure relates generally to data networks and more particularly to directing client requests to Edge Cloud locations satisfying application requirements.

BACKGROUND

The wide adoption of mobile devices along with ubiquitous cellular data coverage has resulted in an unprecedented growth of mobile applications that are dependent on always-accessible wireless networking. In mobile networks, users' locations are constantly changing. Allowing network providers to locate and route a client's traffic to a most suitable location will benefit users by providing an optimized user experience and network providers by utilizing network and computing resources more efficiently.

This background information is provided to reveal information believed by the applicant to be of possible relevance. No admission is necessarily intended, nor should be construed, that any of the preceding information constitutes prior art.

SUMMARY

Various embodiments disclosed herein include devices, systems, and methods for directing client requests to an Edge Cloud location satisfying application requirements associated with the request.

In some embodiments, a domain name service (DNS) query may be received, e.g., from a device directed to a server, and one or more requests associated with the DNS query may be determined. For example, the request may include one or more application requirements, e.g., balancing a load of a network, minimizing latency associated with the DNS query, etc. In some embodiments, a server may be identified based on the one or more requests and the DNS request may be redirected to the identified server. For example, a slice of a network may be identified based on the one or more requests and the server may be identified based on the slice of the network.

In some embodiments, a user equipment (UE) group associated with the device may be identified and the one or more requests associated with the DNS query may be based on the identified UE group. For example, the UE group may be identified based on packet headers such as source IP, source port, protocol, etc. Moreover, the UE group may be identified based on access network metadata, such as location, device type, user-profile, etc.

In some embodiments, a service group associated with the DNS query may be identified and the one or more requests associated with the DNS query may be based on the identified service group. For example, the service group may be identified based on IP addresses in Internet or in On-site apps.

In some embodiments, one or more constraints associated with the DNS query may be determined and the one or more requests associated with the DNS query may be based on the determined one or more constraints. For example, the one more constraints may include latency or bandwidth.

In accordance with some embodiments, a non-transitory computer readable storage medium has stored therein instructions that are computer executable to perform or cause performance of any of the methods described herein.

In accordance with some embodiments, a device includes one or more processors, a non-transitory memory, and one or more programs; the one or more programs are stored in the non-transitory memory and configured to be executed by the one or more processors and the one or more programs include instructions for performing or causing performance of any of the methods described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

FIG. 5 illustrates an exemplary flowchart of a method to direct client access requests in accordance with the present disclosure.

Figure 1:
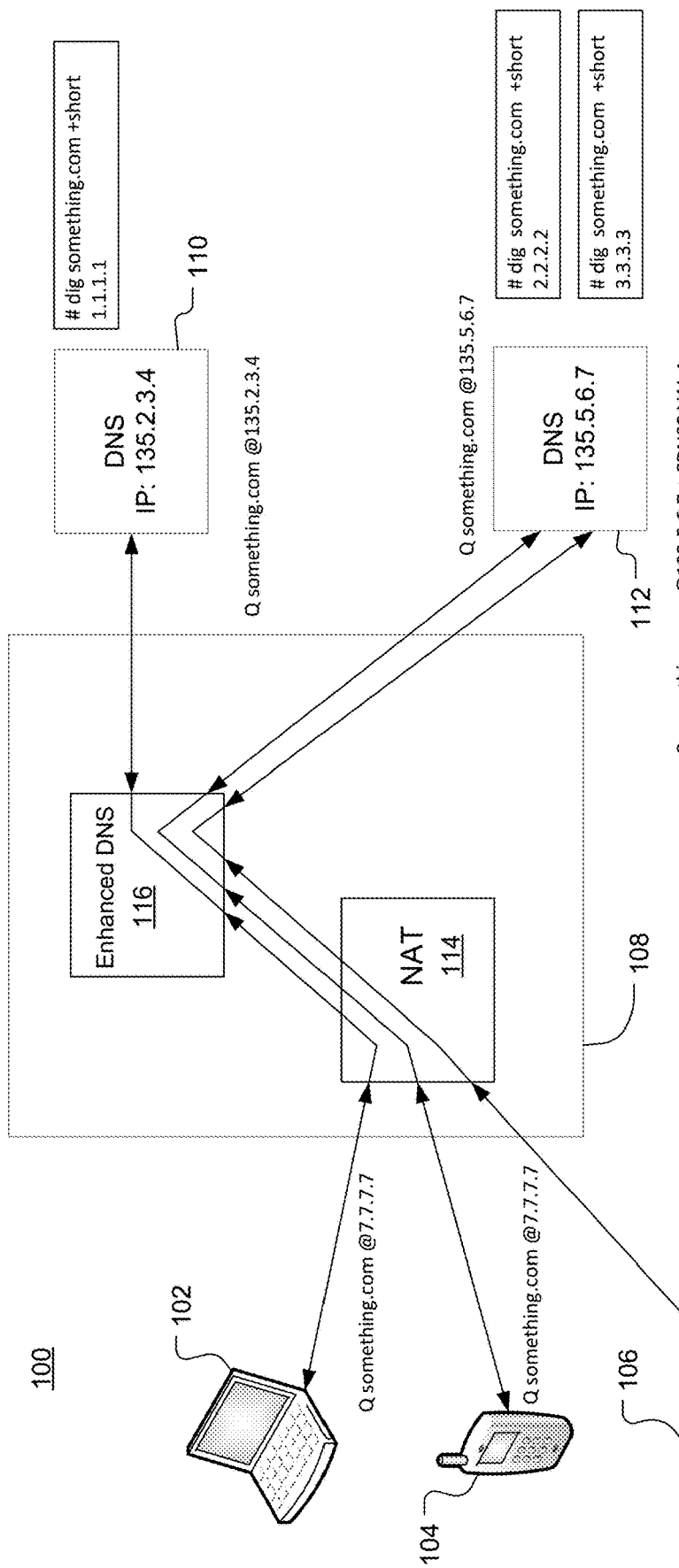
FIG. 1 illustrates an exemplary system to direct client access requests in accordance with the present disclosure.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

According to some embodiments, client requests may be directed to an Edge Cloud location satisfying application requirements. For example, client application requests may be directed to a server location where network characteristics, such as latency and bandwidth, meet application requirements. Moreover, in some embodiments, an existing DNS text field is utilized to describe network parameters needed by a registered application server. Unlike DNS software vendors, which provide functionality where a DNS server returns an IP address located close to the client based on geographical location, embodiments may utilize knowledge of network topology and utilization to direct client requests.

FIG. 1 illustrates an exemplary system 100 to direct client access requests, among other things. System 100 may include device 102 (e.g., a computer), device 104 (e.g., a mobile device), device 106 (e.g., a handheld computing device), domain name service (DNS) server 108, server 110, and server 112. The devices of system 100 may be communicatively connected with each other and one or more networks, e.g., a cloud network. Moreover, the devices of system 100 may be connected by one or more local networks, which may include their own routers, access points, DNS servers, firewalls, or the like.

With continued reference to FIG. 1, devices 102/104/106 may include a laptop, tablet, autonomous vehicle (e.g., SAE Intl level 3 to level 5 automation), or mobile phone, among other things. Moreover, devices 102/104/106 may include wireless or wired devices, such as servers, routers, switches, desktop computers, or the like. DNS server 108, as shown, may include network address translation (NAT) network element 114 and Enhanced DNS network element 116. Each network element (e.g., NAT network element 114 or Enhanced DNS network element 116) may assist in directing client access requests to domains, servers, or content using network functions. In an example, the information of DNS server 108 (e.g., NAT network element 114 or Enhanced DNS network element 116) may include domains, IP addresses, protocols, data flows, content, or the like that may be used to direct client access requests. DNS server 108 may obtain (e.g., receive) information from multiple sources to assist in directing requests to domains, servers, or content. The information of DNS server 108 may include information from databases, other servers, devices, or the like.

According to some embodiments, NAT network element 114 may receive DNS requests from one or more devices (e.g., devices 102/104/106) and may force these requests to go to Enhanced DNS network element 116 by translating destination addresses of all DNS requests. In some embodiments, NAT network element 114 may preserve original source IP addresses of the client. Moreover, the NAT network element 114 may pass the original source IP address to the Enhanced DNS network element 116. Depending on NAT configuration, Enhanced DNS network element 116 may receive any or all DNS requests in the system from users and return a DNS response to users. In the absence of a NAT, users may be configured to set Enhanced DNS network element 116 as their local DNS resolver so that DNS requests from users are received by enhanced DNS network element 116 by default.

In some embodiments, the Enhanced DNS network element 116 may interact with one or more subcomponents of a mobility packet core. For example, the mobility packet core may include subcomponents such as a mobility management entity (MME), a home subscriber server (HSS), policy and charging rules function (PCRF), and the like. In some embodiments, mobility packet core may add additional metadata to a DNS query before it is sent to Enhanced DNS. For example, the metadata may be based on policy configuration in PCRF or current state of user stored in MME. Examples of such metadata may include whether a user's device is a smartphone or a tablet or a laptop or a autonomous vehicle, whether a user has a 3G cellular device or a 4G cellular device or a 5G device, or an estimated location of users (e.g., Times Square, New York City or zip code 12345). Moreover, the metadata may be added to a DNS query using DNS extensions such as EDNS0.

In some embodiments, Enhanced DNS network element 116 may choose to route DNS queries from clients to a downstream DNS server 110 or 112 of its own choosing. This choice may be influenced by the metadata associated with a DNS query such as device type, network slice that device is a part of, or others. In an example, device 102 may submit a DNS request directed to query something.com@7.7.7.7 (e.g., to a DNS Server at IP Address 7.7.7.7), device 104 may submit a DNS request directed to query something.com @8.8.8.8 (e.g., to a DNS Server at IP Address 8.8.8.8), and device 106 may submit a DNS request directed to query something.com@9.9.9.9 (e.g., to a DNS Server at IP Address 9.9.9.9). NAT network element 114 may translate the destination address of each DNS request, e.g., preserving each original source IP address of the client and passing the original source IP address along to Enhanced DNS network element 116.

In some embodiments, Enhanced DNS network element 116 may filter the responses returned by downstream DNS server 110 or 112 based on edge network information available to Enhanced DNS network element 116. The filtering of these responses can be made based on metadata associated with a DNS query, e.g., a metadata could specify that the server should have less than a given latency to the device and should have at least a given network bandwidth to the device.

In some embodiments, Enhanced DNS network element 116 may provide different name/address mapping based on dynamic policy, e.g., allowing Enhanced DNS network element 116 to direct traffic to a preferred location. For example, Enhanced DNS network element 116 may remap the request of device 102 for something.com@7.7.7.7 to something.com @135.2.3.4 (e.g., #dig something.com+short 1.1.1.1) and may remap the request of device 104 for something.com @8.8.8.8 to something.com @135.5.6.7+EDNS0 VAL 1 (e.g., #dig something.com+short 2.2.2.2). In some embodiments, Enhanced DNS network element 116 may add EDNS0 options to the client's request to convey additional information to the downstream DNS server. For example, Enhanced DNS network element 116 may remap the request of device 106 for something.com@9.9.9.9 to something.com @135.5.6.7 (e.g., #dig something.com+short 3.3.3.3) and convey additional metadata to DNS server 112 such as device type or location estimate. Using such techniques, Enhanced DNS network element 116 may facilitate network slicing (e.g., multiplexing of virtualized and independent logical networks on the same physical network infrastructure) by redirecting requests from different devices/groups to different downstream DNS servers. For example, the request of device 102 may be directed to an infrastructure slice (e.g., DNS IP 135.2.3.4) and the requests of devices 104/106 may be directed to a different infrastructure slice (e.g., DNS IP 135.5.6.7).

In some embodiments, Enhanced DNS network element 116 may trigger the insertion of additional service functions on path from user to server. Examples of these service functions include firewall and deep packet inspection related security appliances. In some embodiments, prior to returning the response of the DNS query to the user, Enhanced DNS network element 116 may configure the network data plane (e.g., switches and routers) to route traffic from this user via a specific sequence of service functions. In some embodiments, the data plane may use mechanisms such as segment routing (SRv6) to implement the routing via service functions as directed by Enhanced DNS network element 116.

Figure 2:
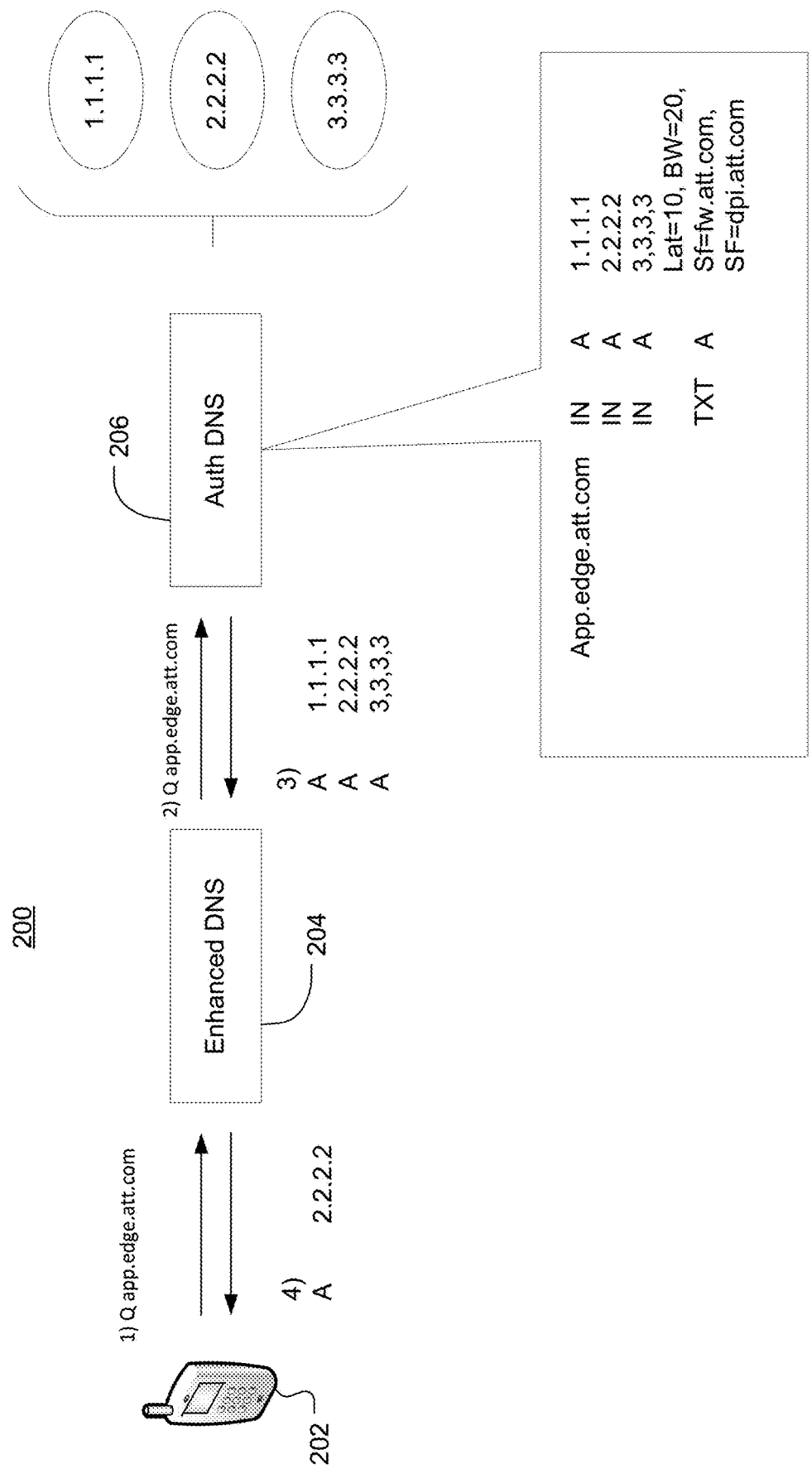
FIG. 2 illustrates an exemplary system to direct client access requests in accordance with the present disclosure.

FIG. 2 illustrates an exemplary system 200 to direct client access requests deployed by an edge network, among other things. System 200 may include device 202 (e.g., a mobile device), a local domain name service such as Enhanced DNS 204, authoritative DNS server 206. The devices of system 200 may be communicatively connected with each other and one or more networks, e.g., a cloud network. Moreover, the devices of system 200 may be connected by one or more local networks, which may include their own vRouters, access points, DNS servers, firewalls, or the like.

In some embodiments, system 200 in FIG. 2 may provide a mechanism for third parties to register certain fully qualified domain names (e.g., app.edge.att.com), or in short FQDNs. Enhanced DNS 204 may only modify queries or responses only for these registered domain names, and thereby affect their edge cloud resource allocation based on edge network information. However, in other embodiments, Enhanced DNS 204 may modify queries and responses for DNS requests for any domain names from users.

With continued reference to FIG. 2, device 202 may be a laptop, tablet, autonomous vehicle (e.g., SAE Intl level 3 to level 5 automation), or mobile phone, among other things. Moreover, device 202 may include wireless or wired devices, such as servers, routers, switches, desktop computers, or the like. In some embodiments, Enhanced DNS 204 may be deployed as a standalone resolver/cache or may be a part of authoritative DNS server 206. In some embodiments, Enhanced DNS 204 may be a plugin (e.g., a chained plugin for DNS software), file, message, or the like that may assist in directing client access requests to domains, servers, or content using network functions. In an example, the information of Enhanced DNS 204 may include domains, IP addresses, protocols, data flows, content, or the like that may be used to direct client access requests. Moreover, Enhanced DNS 204 may obtain (e.g., receive) information from multiple sources to assist in directing requests to domains, servers, or content. The information of Enhanced DNS 204 may include information from databases, other servers, devices, or the like.

According to some embodiments, Enhanced DNS 204 may receive DNS requests from one or more devices (e.g., device 202) and may translate destination addresses of all DNS requests. In an example, device 202 may submit a DNS request directed to query app.edge.att.com. Enhanced DNS 204 may receive the DNS request and may select an optimal service replica, e.g., based on network topology and latency. For example, authoritative DNS server 206 may store several address records associated with a domain name (e.g., for app.edge.att.com, 1.1.1.1 at Location A, 2.2.2.2 at Location B, and 3.3.3.3 at Location C). In some embodiments, authoritative DNS server 206 may include a text record associated with the domain name to store one or more application requirements (e.g., maximum latency, minimum bandwidth, service functions to visit using SRv6, etc.). For example, authoritative DNS server 206 may store a text record associated with app.edge.att.com (e.g., latency=10, bandwidth=20, service function=fw.att.com, or service function=dpi.att.com).

In some embodiments, Enhanced DNS 204 may return a single IP address (e.g., based on best latency) or Enhanced DNS 204 may return Round-Robin (RR) load balanced IP addresses (e.g., if A records have similar latencies between client and server). For example, Enhanced DNS 204 may select address 2.2.2.2 as the best path to app.edge.att.com.

Figure 3:
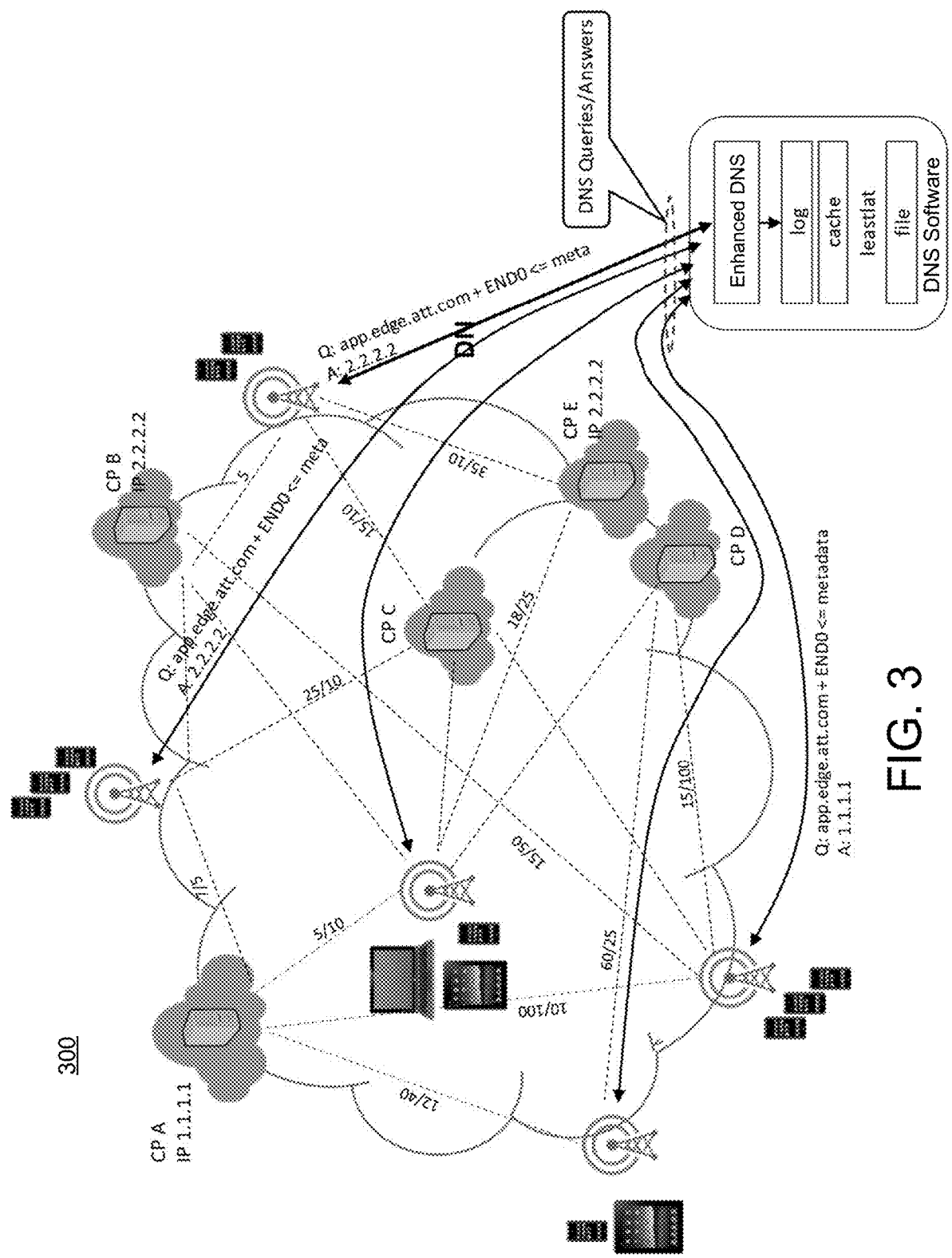
FIG. 3 illustrates an exemplary system to direct client access requests in accordance with the present disclosure.

FIG. 3 illustrates an exemplary system 300 to direct client access requests, its deployment in an edge network, among other things. According to some embodiments, one or more DNS servers store several address records associated with the name, e.g., the address records including IP address(es) for a best path associated with the name. For example, Enhanced DNS may return a single IP address based on data comparisons including least latency, greatest bandwidth, least load, etc. or may return RR load balanced IP's if one or more paths between client and servers have similar properties.

In some embodiments, Enhanced DNS may be implemented as a DNS software plugin, e.g., allowing network enhancements without significant development effort. Such an implementation could support tens of thousands of DNS queries per second on a single CPU core. Moreover, a DNS software may be based on a distributed key value store, e.g., to allow for horizontal scaling to multiple servers to serve larger DNS query volumes.

In some embodiments, an Enhanced DNS plugin may use a graph with nodes holding IP addresses and edges with measured network properties (e.g., bandwidth or latency) as shown in annotated edges in FIG. 3. Enhanced DNS may store this graph as a connectivity matrix between network locations (e.g. 4G/5G radio, or mobility packet core) and deployed Edge Cloud sites, e.g., the connectivity matrix including latency, provisioned bandwidth, or utilization of the network links. When each client request comes in to resolve name to IP address, Enhanced DNS may retrieve A/AAAA records for the name from anther downstream DNS server and locate a server IP address which has a best match. In addition to an A/AAAA record which stores name to IP address mapping, a TXT record could be used to describe minimum required network capabilities for a registered server name (e.g., latency=10, bandwidth=20). Accordingly, Enhanced DNS may return to the client an IP address of a server located in the Edge Cloud site which satisfies requirements of bandwidth and latency.

In some embodiments, mobility core elements, e.g., User Plane Function (UPF), may add one or more EDNS0 options to a DNS request with client's metadata or IP's to provide enhancement capabilities. For example, enhancement capabilities may include returning an IP address of a server holding content suitable for a client's device, parental control, or a blacklist for security. In some embodiments, additional advanced services may be offered using IP routing capabilities, e.g., SRv6 (segment routing), to route traffic to location(s) using specific paths, as well as traversing value added services (e.g., firewall, deep packet inspection, etc.) using service chaining properties of SRv6.

Figure 4A:
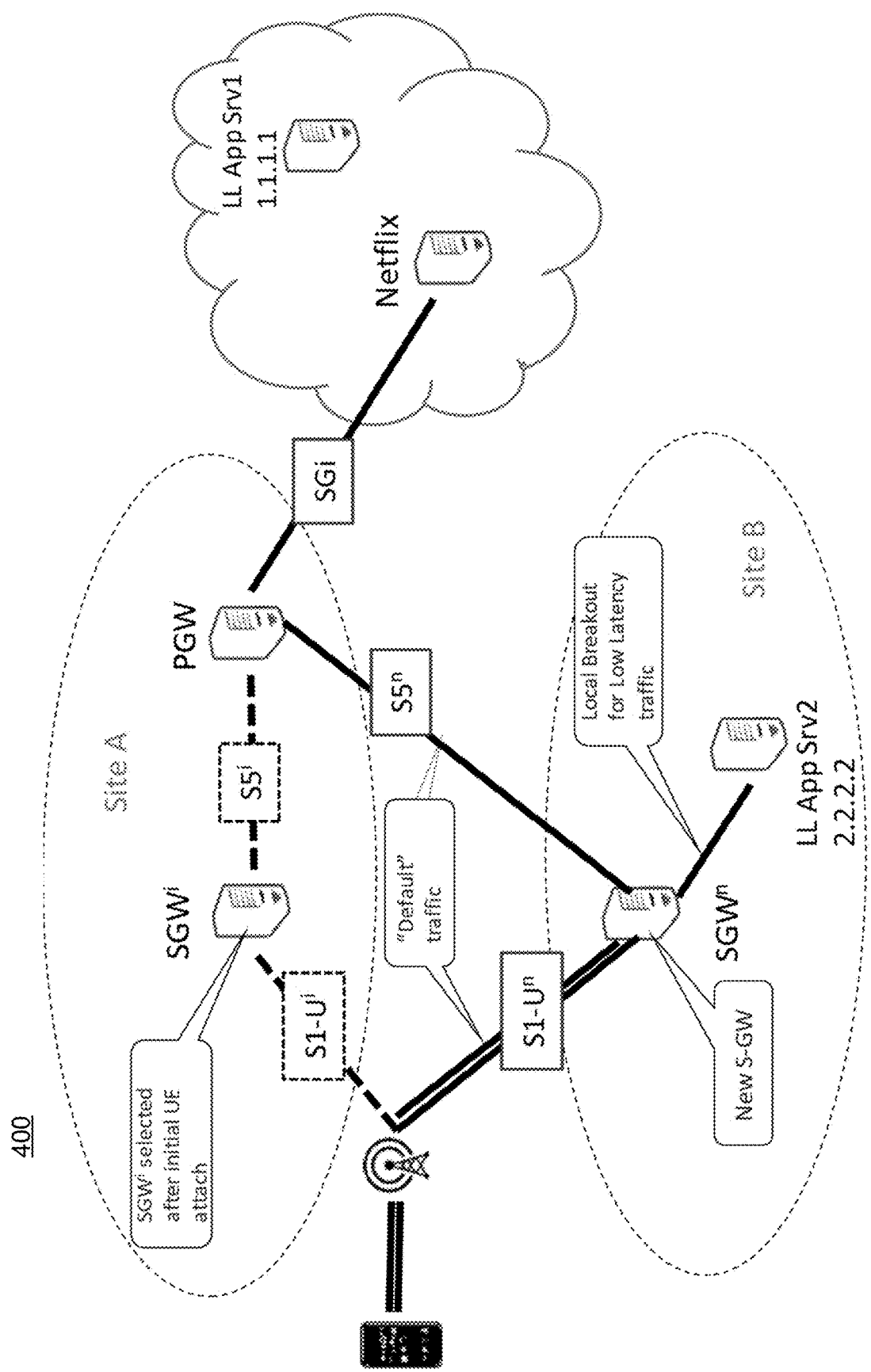
FIG. 4A illustrates an exemplary system to direct client access requests in accordance with the present disclosure.
Figure 4B:
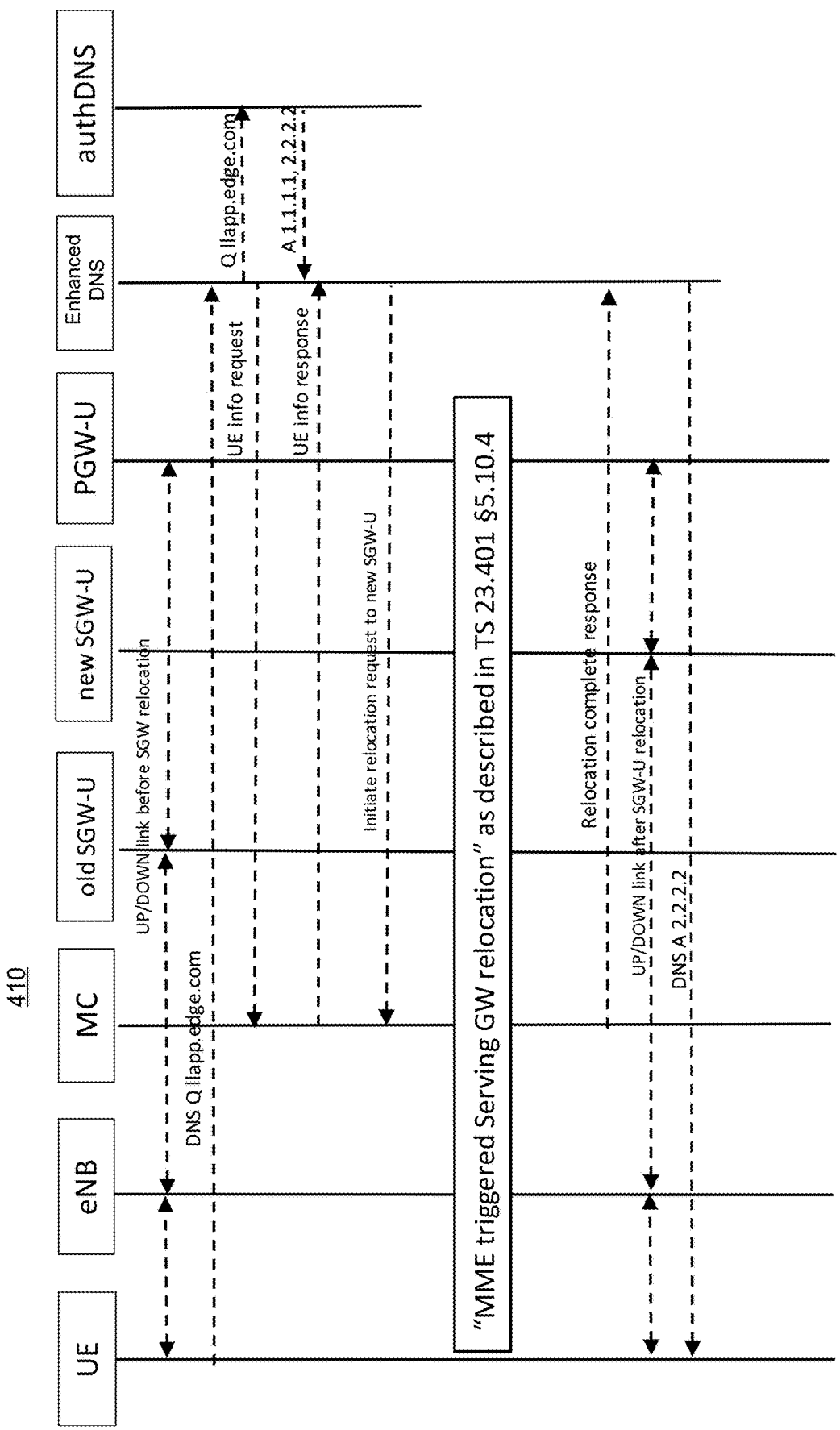
FIG. 4B illustrates an exemplary sequence diagram to direct client access requests in accordance with the present disclosure.

FIG. 4A illustrates an exemplary system 400 to direct client access requests while simultaneously changing the network routing and FIG. 4B illustrates an exemplary sequence diagram 410 to direct client access requests while simultaneously changing the network routing, among other things. In some embodiments, application owners may register one or more "low latency" application fully qualified domain names (FQDNs) using application programming interfaces (APIs). For example, an Enhanced DNS server located in a mobility packet core may process a customer's DNS query and may match the customer's DNS query with the list of registered applications FQDNs. If a match is found, Enhanced DNS may query a mobility core (MC) to get customer info (e.g., location, etc.). For example, the DNS proxy may get customer info based on a source IP address of the customer DNS query or may retrieve address records from one or more downstream DNS servers. In some embodiments, the DNS proxy may determine a best target server from a returned list of address records as well as a suitable serving gateway user plane (SGW-U) part of mobility packet core, e.g., providing a minimum latency path between a user equipment (UE) and a target application server.

As illustrated in FIG. 4B, according to some embodiments, Enhanced DNS may trigger a network routing change to reduce user-to-server latency as follows. It may signal an MME, which a part of mobility packet core, to perform MME triggered serving gateway relocation. A change in serving GW may be necessary to achieve the least latency from user to server. For example, the MME serving gateway control function may select a new SGW-U and signal old and new serving gateways (SGW) to initiate relocation. For example, MME SGW-C may accept an SGW-U identification (ID) from an external application (e.g., Enhanced DNS) and the external application may return a response to the UE. In some embodiments, the target SGW-U may utilize a local breakout (e.g., located close to new SGW-U) to deliver traffic between the UE and the application.

FIG. 5 illustrates an exemplary flowchart of a method 500 direct client access requests. The method 500 may be performed at a network device, UE, desktop, laptop, mobile device, server device, or by multiple devices in communication with one another. In some examples, the method 500 is performed by processing logic, including hardware, firmware, software, or a combination thereof. In some examples, the method 500 is performed by a processor executing code stored in a computer-readable medium (e.g., memory).

As shown in method 500, at block 510, there may be receipt of a DNS query. For example, the DNS query may be received from a device directed to a server. In some embodiments, a UE group associated with the device may be identified, e.g., based on packet headers (e.g., source IP, source port, protocol, etc.) or network metadata (location, device type, user-profile, etc.). Moreover, in some embodiments, a service group associated with the DNS query may be identified. For example, the service group may be identified based on IP addresses in Internet or in On-site apps. In some embodiments, one or more constraints (e.g., latency or bandwidth) associated with the DNS query may be determined.

As shown in method 500, at block 520, one or more requests associated with the DNS query may be determined. For example, a request may include one or more application requirements, such as balancing a load of a network or minimizing latency associated with DNS query. Moreover, in some embodiments, the requests associated with the DNS query may be determined based on a UE group, a service group, or constraints identified at block 510.

As shown in method 500, at block 530, a server may be identified based on the one or more requests. For example, a slice of a network may be identified based on the one or more requests.

As shown in method 500, at block 540, the DNS query may be redirected to the identified server. For example, the DNS query may be directed to an identified slice of a network identified at block 530.

Figure 6:
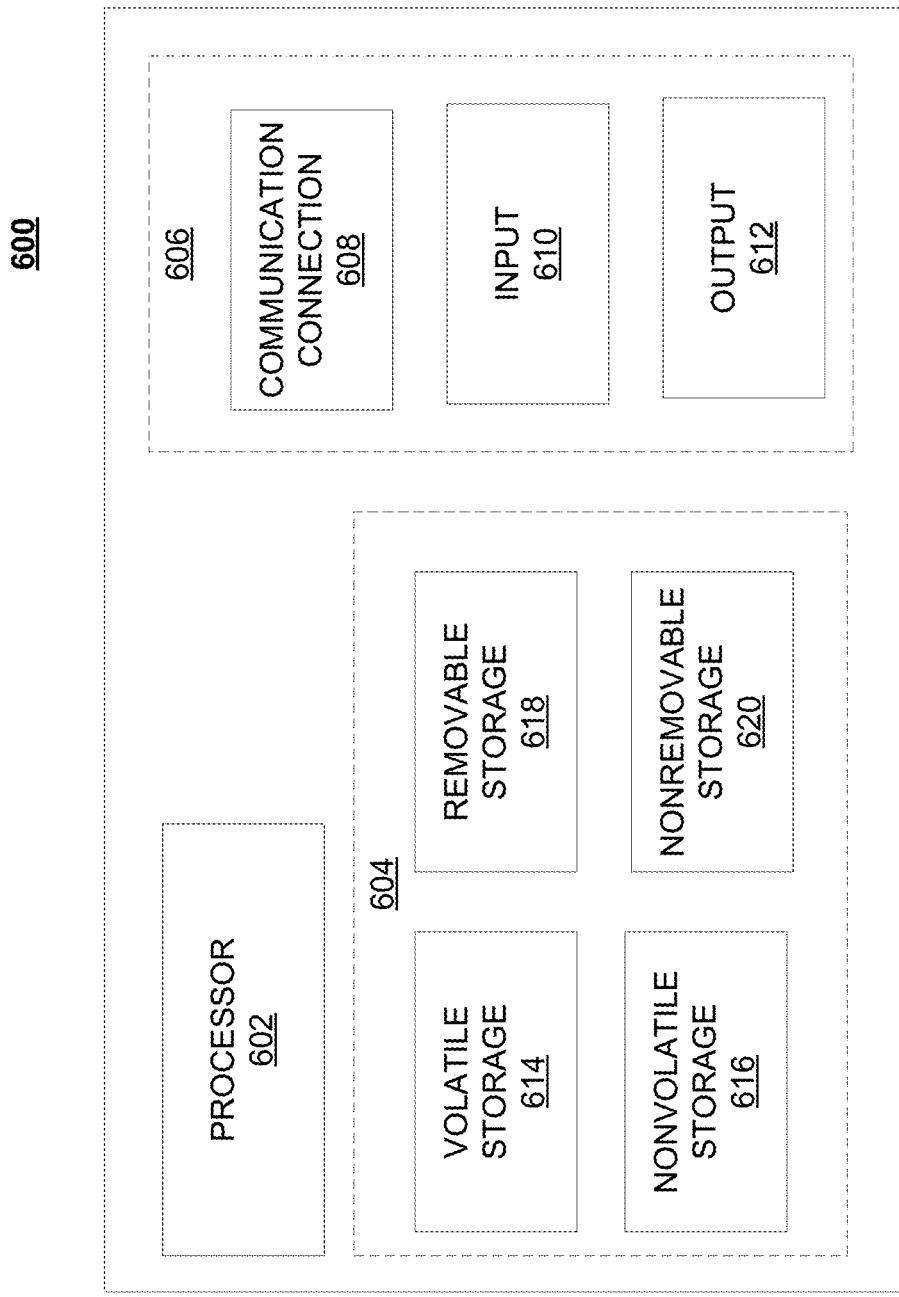
FIG. 6 illustrates a schematic of an exemplary network device.

FIG. 6 is a block diagram of network device 600 that may be connected to or comprise a component of system 100. Network device 600 may comprise hardware or a combination of hardware and software. The functionality to direct client access requests may reside in one or a combination of network devices 600. Network device 600 depicted in FIG. 6 may represent or perform functionality of an appropriate network device 600, or a combination of network devices 600, such as, for example, a component or various components of a cellular broadcast system wireless network, a processor, a server, a gateway, an LTE or 5G anchor node or eNB, a mobile switching center (MSC), a short message service center (SMSC), an automatic location function server (ALFS), a gateway mobile location center (GMLC), a serving gateway (S-GW) 430, a packet data network (PDN) gateway, an RAN, a serving mobile location center (SMLC), or the like, or any appropriate combination thereof. It is emphasized that the block diagram depicted in FIG. 6 is exemplary and not intended to imply a limitation to a specific embodiment or configuration. Thus, network device 600 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 600 may comprise a processor 602 and a memory 604 coupled to processor 602. Memory 604 may contain executable instructions that, when executed by processor 602, cause processor 602 to effectuate operations associated with directing client access requests. As evident from the description herein, network device 600 is not to be construed as software per se.

In addition to processor 602 and memory 604, network device 600 may include an input/output system 606. Processor 602, memory 604, and input/output system 606 may be coupled together (coupling not shown in FIG. 6) to allow communications between them. Each portion of network device 600 may comprise circuitry for performing functions associated with each respective portion. Thus, each portion may comprise hardware, or a combination of hardware and software. Accordingly, each portion of network device 600 is not to be construed as software per se. Input/output system 606 may be capable of receiving or providing information from or to a communications device or other network entities configured for telecommunications. For example, input/output system 606 may include a wireless communications (e.g., 3G/4G/5G/GPS) card. Input/output system 606 may be capable of receiving or sending video information, audio information, control information, image information, data, or any combination thereof. Input/output system 606 may be capable of transferring information with network device 600. In various configurations, input/output system 606 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 606 may comprise a Wi-Fi finder, a two-way GPS chipset or equivalent, or the like, or a combination thereof.

Input/output system 606 of network device 600 also may contain a communication connection 608 that allows network device 600 to communicate with other devices, network entities, or the like. Communication connection 608 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 606 also may include an input device 610 such as keyboard, mouse, pen, voice input device, or touch input device. Input/output system 606 may also include an output device 612, such as a display, speakers, or a printer.

Processor 602 may be capable of performing functions associated with telecommunications, such as functions for directing client access requests, as described herein. For example, processor 602 may be capable of, in conjunction with any other portion of network device 600, receiving a DNS query, determining one or more requests associated with the DNS query, identifying a server based on the one or more requests, and redirecting the DNS query to the identified server, as described herein.

Memory 604 of network device 600 may comprise a storage medium having a concrete, tangible, physical structure. As is known, a signal does not have a concrete, tangible, physical structure. Memory 604, as well as any computer-readable storage medium described herein, is not to be construed as a signal. Memory 604, as well as any computer-readable storage medium described herein, is not to be construed as a transient signal. Memory 604, as well as any computer-readable storage medium described herein, is not to be construed as a propagating signal. Memory 604, as well as any computer-readable storage medium described herein, is to be construed as an article of manufacture.

Memory 604 may store any information utilized in conjunction with telecommunications. Depending upon the exact configuration or type of processor, memory 604 may include a volatile storage 614 (such as some types of RAM), a nonvolatile storage 616 (such as ROM, flash memory), or a combination thereof. Memory 604 may include additional storage (e.g., a removable storage 618 or a non-removable storage 620) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 600. Memory 604 may comprise executable instructions that, when executed by processor 602, cause processor 602 to effectuate operations to directing client requests to an Edge Cloud location satisfying application requirements associated with the request.

Figure 7:
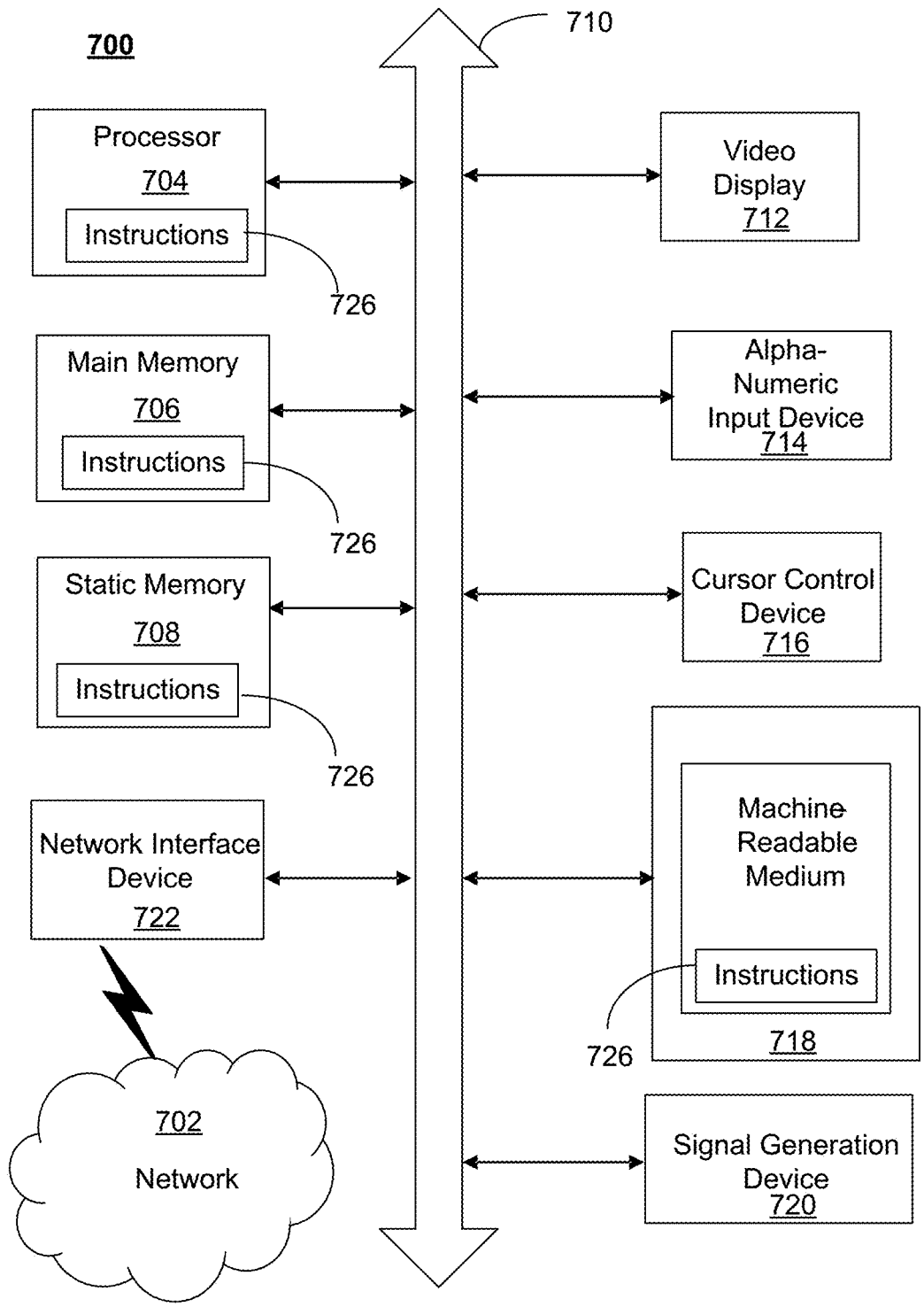
FIG. 7 illustrates a schematic of an exemplary machine in the form of a computer system.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as processor 602, servers 108/110/112/206, devices 102/104/106/202, and other devices of FIG. 1, FIG. 2, FIG. 3, FIG. 4, FIG. 5, and FIG. 6. In some examples, the machine may be connected (e.g., using a network 702) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 700 may include a processor (or controller) 704 (e.g., a central processing unit (CPU)), a graphics processing unit (GPU, or both), a main memory 706 and a static memory 708, which communicate with each other via a bus 710. The computer system 700 may further include a display unit 712 (e.g., a liquid crystal display (LCD), a flat panel, or a solid-state display). Computer system 700 may include an input device 714 (e.g., a keyboard), a cursor control device 716 (e.g., a mouse), a disk drive unit 718, a signal generation device 720 (e.g., a speaker or remote control) and a network interface device 722. In distributed environments, the examples described in the subject disclosure can be adapted to utilize multiple display units 712 controlled by two or more computer systems 700. In this configuration, presentations described by the subject disclosure may in part be shown in a first of display units 712, while the remaining portion is presented in a second of display units 712.

The disk drive unit 718 may include a tangible computer-readable storage medium on which is stored one or more sets of instructions (e.g., instructions 726) embodying any one or more of the methods or functions described herein, including those methods illustrated above. Instructions 726 may also reside, completely or at least partially, within main memory 706, static memory 708, or within processor 704 during execution thereof by the computer system 700. Main memory 706 and processor 704 also may constitute tangible computer-readable storage media.

In describing preferred methods, systems, or apparatuses of the subject matter of the present disclosure—directing client access requests—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods.

What is claimed:

1. A network device comprising:
   a processor; and
   a memory coupled with the processor, the memory comprising executable instructions that when executed by the processor cause the processor to effectuate operations comprising:
      receiving a request comprising domain name service (DNS) query from a client device and one or more thresholds;
      based on the DNS query, determining a plurality of DNS records pointing to a plurality of internet protocol (IP) addresses associated with a respective server of a plurality of servers, wherein the IP addresses are different, and wherein the plurality of servers are different;
      identifying a location of the client device;
      identifying respective latency for each path between the client device and each of the plurality of servers;
      determining a first path to a first server of the plurality of servers meets the one or more thresholds; and
      based on determining that the first server meets the one or more thresholds, responding to the request with a first IP address that corresponds to the first server identified in the DNS records.

2. The network device of claim 1, wherein the request includes balancing a load of a network.

3. The network device of claim 1, wherein the one or more thresholds include a minimum latency threshold.

4. The network device of claim 1, the operations further comprising identifying a slice of a network based on the one or more thresholds, wherein the server is identified based on the slice of the network.

5. The network device of claim 1, the operations further comprising identifying a user equipment (UE) group associated with the device.

6. The network device of claim 5, the operations further comprising identifying access network metadata associated with the DNS query, wherein the UE group is identified based on the access network metadata.

7. The network device of claim 1, the operations further comprising:
identifying packet headers associated with the DNS query; and
identifying a UE group based on the packet headers.

8. The network device of claim 1, the operations further comprising identifying a service group associated with the DNS query, wherein the request is based on the identified service group.

9. The network device of claim 1, the operations further comprising determining one or more constraints associated with the DNS query, wherein the one or more thresholds are based on the determined one or more constraints.

10. A system comprising:
one or more processors; and
memory including instructions that, when executed by the one or more processors, cause the system to:
receive a request comprising domain name service (DNS) query from a client device and one or more thresholds;
based on the DNS query, determine a plurality of DNS records pointing to a plurality of internet protocol (IP) addresses associated with a respective server of a plurality of servers, wherein the IP addresses are different, and wherein the plurality of servers are different;
identify a location of the client device;
identify respective latency for each path between the client device and each of the plurality of servers;
determine a first path to a first server of the plurality of servers meets the one or more thresholds; and
based on determining that the first server meets the one or more thresholds, respond to the request with a first IP address that corresponds to the first server identified in the DNS records.

11. The system of claim 10, wherein the one or more thresholds include a minimum latency threshold.

12. The system of claim 10, wherein the instructions are further configured to cause the system to identify a slice of a network based on the one or more thresholds, wherein the server is identified based on the slice of the network.

13. The system of claim 10, wherein the instructions are further configured to cause the system to identify a user equipment (UE) group associated with the device.

14. The system of claim 13, wherein the instructions are further configured to cause the system to identify packet headers associated with the DNS query, wherein the UE group is identified based on the packet headers.

15. The system of claim 13, wherein the instructions are further configured to cause the system to identify access network metadata associated with the DNS query, wherein the UE group is identified based on the access network metadata.

16. The system of claim 10, wherein the instructions are further configured to cause the system to identify a service group associated with the DNS query, wherein the request is based on the identified service group.

17. The system of claim 10, wherein the instructions are further configured to cause the system to determine one or more constraints associated with the DNS query, wherein the one or more thresholds are based on the determined one or more constraints.

18. A computer program product comprising:
a computer-readable storage medium; and
instructions stored on the computer-readable storage medium that, when executed by a processor, causes the processor to:
receive a request comprising domain name service (DNS) query from a client device and one or more thresholds;
based on the DNS query, determine a plurality of DNS records pointing to a plurality of internet protocol (IP) addresses associated with a respective server of a plurality of servers, wherein the IP addresses are different, and wherein the plurality of servers are different;
identify a location of the client device;
identify respective latency for each path between the client device and each of the plurality of servers;
determine a first path to a first server of the plurality of servers meets the one or more thresholds; and
based on determining that the first server meets the one or more thresholds, respond to the request with a first IP address that corresponds to the first server identified in the DNS records.

19. The computer program product of claim 18, wherein the one or more thresholds include a minimum latency threshold.

* * * * *